(12) United States Patent
Zittel et al.

(10) Patent No.: US 12,357,014 B2
(45) Date of Patent: Jul. 15, 2025

(54) SCREW BLANCHER

(71) Applicant: Lyco Manufacturing Inc., Columbus, WI (US)

(72) Inventors: David R. Zittel, Columbus, WI (US); Daniel D. Maupin, Corvallis, OR (US); James R. Meyer, Beaver Dam, WI (US)

( * ) Notice: Subject to any disclaimer, the term of this patent is extended or adjusted under 35 U.S.C. 154(b) by 930 days.

(21) Appl. No.: 17/499,436

(22) Filed: Oct. 12, 2021

(65) Prior Publication Data

US 2022/0117287 A1 Apr. 21, 2022

Related U.S. Application Data

(60) Provisional application No. 63/092,924, filed on Oct. 16, 2020.

(51) Int. Cl.
*A23N 12/04* (2006.01)
*A23B 7/06* (2006.01)

(52) U.S. Cl.
CPC ............... *A23N 12/04* (2013.01); *A23B 7/06* (2013.01)

(58) Field of Classification Search
CPC .................................. A23B 7/06; A23N 12/04
USPC .......................................................... 99/348
See application file for complete search history.

(56) References Cited

U.S. PATENT DOCUMENTS

| | | | | | |
|---|---|---|---|---|---|
| 562,158 | A | * | 6/1896 | Sears | F27B 7/00 126/149 |
| 1,520,872 | A | * | 12/1924 | Larsen | A01J 15/06 99/463 |
| 3,146,109 | A | * | 8/1964 | Frondorf | A21D 6/003 99/348 |
| 3,253,533 | A | * | 5/1966 | Benson | A23L 3/185 99/323.4 |
| 4,072,093 | A | * | 2/1978 | Zimmer | A21B 5/02 99/365 |
| 4,455,762 | A | * | 6/1984 | Saeman | C03B 1/02 34/178 |
| 4,458,428 | A | * | 7/1984 | Saeman | C03B 1/02 34/232 |
| 4,664,527 | A | * | 5/1987 | Schuler | B01F 29/63 366/186 |
| 4,688,476 | A | * | 8/1987 | Zittel | A23B 7/06 99/348 |
| 4,981,073 | A | * | 1/1991 | Zittel | A23N 15/12 99/639 |

(Continued)

*Primary Examiner* — Jimmy Chou
(74) *Attorney, Agent, or Firm* — Reinhart Boerner Van Deuren s.c.

(57) ABSTRACT

A blancher includes a tank and auger. The tank has a wall defining an interior space at least partially cylindrical with end walls. The auger is in the interior space and has flights Each flight has a circumferential edge in close proximity to the wall. The flights move food product from one end to the other as the augur is turned. The auger is preferably supported by a trunnion ring extending through the end wall and as the trunnion ring turns the augur and of flights are turned. An inlet is preferably located at one end wall and located along a center line of the augur. An outlet is preferably a discharge chute extending through the other end wall. The auger preferably includes at least one lifting flight between the plurality of flights and the end, such that the lifting flight lifts the food product to the discharge chute.

24 Claims, 14 Drawing Sheets

(56) References Cited

U.S. PATENT DOCUMENTS

| | | | | |
|---|---|---|---|---|
| 5,133,249 A * | 7/1992 | Zittel | | A23L 3/185 |
| | | | | 134/132 |
| 5,146,841 A * | 9/1992 | Zittel | | A23L 3/185 |
| | | | | 100/145 |
| 5,327,817 A * | 7/1994 | Zittel | | A47J 27/14 |
| | | | | D7/381 |
| 5,329,842 A * | 7/1994 | Zittel | | F25D 25/04 |
| | | | | 99/360 |
| 5,341,729 A * | 8/1994 | Zittel | | F28F 5/02 |
| | | | | 134/132 |
| 5,427,015 A * | 6/1995 | Zittel | | A23B 7/06 |
| | | | | 134/132 |
| 5,433,849 A * | 7/1995 | Zittel | | B01D 33/72 |
| | | | | 209/291 |
| 5,592,869 A * | 1/1997 | Zittel | | A23B 7/06 |
| | | | | 100/145 |
| 5,632,195 A * | 5/1997 | Zittel | | A23L 3/185 |
| | | | | 134/132 |
| 5,669,288 A * | 9/1997 | Zittel | | A23N 12/04 |
| | | | | 99/360 |
| 5,752,431 A * | 5/1998 | Zittel | | A23N 12/04 |
| | | | | 134/132 |
| 6,095,035 A * | 8/2000 | Zittel | | A23B 7/158 |
| | | | | 366/291 |
| 6,105,485 A * | 8/2000 | Zittel | | A23L 3/0155 |
| | | | | 134/132 |
| 6,182,833 B1 * | 2/2001 | Zittel | | B01D 33/11 |
| | | | | 210/411 |
| 6,187,360 B1 * | 2/2001 | Zittel | | A47J 37/047 |
| | | | | 426/511 |
| 6,205,913 B1 * | 3/2001 | Zittel | | A23N 12/04 |
| | | | | 134/132 |
| 6,214,400 B1 * | 4/2001 | Zittel | | A23L 5/17 |
| | | | | 426/511 |
| 6,234,066 B1 * | 5/2001 | Zittel | | A47J 37/047 |
| | | | | 99/348 |
| 6,263,785 B1 * | 7/2001 | Zittel | | A47J 37/047 |
| | | | | 426/523 |
| 6,419,094 B1 * | 7/2002 | Zittel | | B01D 33/42 |
| | | | | 210/403 |
| 6,578,468 B1 * | 6/2003 | Horn | | B01F 27/1143 |
| | | | | 366/144 |
| 6,615,707 B1 * | 9/2003 | Zittel | | A23B 7/06 |
| | | | | 99/348 |
| 7,168,846 B1 * | 1/2007 | Maupin | | B01F 29/61 |
| | | | | 366/226 |
| 7,500,426 B2 * | 3/2009 | Zittel | | A23L 3/185 |
| | | | | 134/132 |
| 7,735,415 B2 * | 6/2010 | Zittel | | A23B 7/06 |
| | | | | 134/132 |
| 8,087,348 B2 * | 1/2012 | Maupin | | B01D 29/58 |
| | | | | 99/348 |
| 8,191,466 B2 * | 6/2012 | Maupin | | A23N 12/023 |
| | | | | 99/348 |
| 10,085,477 B2 * | 10/2018 | Maupin | | A23B 7/06 |
| 10,112,785 B2 | 10/2018 | Stousland et al. | | |
| 10,143,209 B2 | 12/2018 | Maupin et al. | | |
| 10,709,161 B2 * | 7/2020 | Zittel | | B01D 29/356 |
| 11,064,724 B2 * | 7/2021 | Maupin | | A23B 7/06 |
| 2002/0096269 A1 * | 7/2002 | Bouchette | | D21C 5/02 |
| | | | | 162/264 |
| 2003/0146137 A1 * | 8/2003 | Bichel | | A23N 12/005 |
| | | | | 209/288 |
| 2005/0082144 A1 * | 4/2005 | Maupin | | A23N 12/023 |
| | | | | 99/628 |
| 2006/0144256 A1 * | 7/2006 | Muir | | A23G 1/18 |
| | | | | 99/483 |
| 2006/0213372 A1 * | 9/2006 | Zittel | | A23L 3/185 |
| | | | | 99/348 |
| 2006/0283333 A1 * | 12/2006 | Zittel | | A23L 3/00 |
| | | | | 99/348 |
| 2007/0044666 A1 * | 3/2007 | Zittel | | B01D 29/58 |
| | | | | 99/348 |
| 2010/0014925 A1 * | 1/2010 | Stousland | | A47J 36/00 |
| | | | | 406/198 |
| 2010/0015311 A1 * | 1/2010 | Stousland | | B65G 53/30 |
| | | | | 406/48 |
| 2010/0043649 A1 * | 2/2010 | Maupin | | A47J 37/044 |
| | | | | 99/348 |
| 2011/0005241 A1 * | 1/2011 | Zittel | | A23L 3/361 |
| | | | | 62/63 |
| 2011/0072980 A1 * | 3/2011 | Maupin | | A23B 7/158 |
| | | | | 99/348 |
| 2015/0251267 A1 * | 9/2015 | Winn | | B23K 10/00 |
| | | | | 83/76.1 |
| 2016/0008920 A1 * | 1/2016 | Goya | | B23K 26/36 |
| | | | | 219/121.61 |
| 2022/0355225 A1 * | 11/2022 | Maupin | | B01D 33/067 |

\* cited by examiner

SCREW BLANCHER

FIELD OF THE INVENTION

The present disclosure relates generally to the art of blanchers. More specifically, it relates to a screw blancher.

BACKGROUND OF THE INVENTION

Prior art screw blanchers have typically included a shaft driven auger that is turned and supported by shafts on each end. Some prior art food blanchers include an auger covered by a perforated screen (forming a cylindrical shape). The auger/screen assembly is disposed in a tank and typically sits above (six inches, e.g.) the tank bottom. One such prior art blancher is the Lyco™ 800 Rotary Drum Blancher. Other prior art rotary drum blanchers are described in U.S. Pat. Nos. 6,234,066, 6,187,360, 10709161, 8191466, 10112785, 10143209, 10085477, all of which are hereby incorporated by reference. Product is discharged using a discharge mechanism. Prior art discharge mechanisms can be seen in U.S. Pat. Nos. 7,735,415 and 5,341,729, both of which are hereby incorporated by reference. Other prior art discharge mechanisms includes a ferris wheel style discharge. Prior art designs can be costly, hard to adjust, and hard to clean. Also, they do not allow the product to enter and discharge the machine from the center of the tube.

Typical prior art screw blanchers would input product from above and sometimes off-center-line of the machine to avoid falling on the auger. This design has drawbacks, and requires a high water level.

Prior art screw blanchers have a screw-to-tank tolerance that is typically small, and near or smaller than the size of the food particle being processed. During cleaning, it is difficult to get any particulates from the inside of the unit to the outside of the unit unless the auger is slowly turned. It is very difficult to wash out these particles.

Another type of blancher is a rotary drum blanchers. This type of blancher has been supported with trunnion rings (see U.S. Pat. No. 7,500,426 hereby incorporated by reference). However, to repair or replace the trunnions the drum must be jacked up or independently supported. One prior art machine had retractable trunnions supporting a drum, allowing an operating position and a retracted position to change or service the trunnions.

A relatively lower cost screw blancher that is easy to clean and adjustable is desired.

SUMMARY OF THE PRESENT INVENTION

According to a first aspect of the disclosure a blancher for processing food product includes a tank and an auger. The tank has a wall defining an interior space that is at least partially generally cylindrical, and has first and second end walls. The auger is disposed in the interior space, and the auger has a plurality of flights Each flight has a circumferential edge disposed in close proximity to the wall. The plurality of flights move the food product from the first end to the second end as the augur is turned. The auger is supported by a trunnion ring extending through the first end wall, such that as the trunnion ring turns, the augur and the plurality of flights are turned.

According to a second aspect of the disclosure a blancher for processing food product comprises a tank, an augur and an inlet. The tank has a wall defining an interior space that is at least partially generally cylindrical, and has first and second end walls. The auger is disposed in the interior space, and the auger has a plurality of flights. Each flight has a circumferential edge disposed in close proximity to the wall. The plurality of flights move the food product from the first end to the second end as the augur is turned. The inlet is located at the first end wall and further located along a center line of the augur.

According to a third aspect of the disclosure a blancher for processing food product comprises a tank, an augur and a discharge chute. The tank has a wall defining an interior space that is at least partially generally cylindrical, and has first and second end walls. The auger is disposed in the interior space, and the auger has a plurality of flights. Each flight has a circumferential edge disposed in close proximity to the wall. The plurality of flights move the food product from the first end to the second end as the augur is turned. The discharge chute extends through the second end wall. The auger includes at least one lifting flight between the plurality of flights and the second end, such that the lifting flight lifts the food product to the discharge chute.

The trunnion ring is supported by a first set of trunnions wheels operatively located with the first end wall in one alternative.

A position of the first set of trunnions wheels is adjustable in another alternative.

A second trunnion ring extends through the second end wall and the second trunnion ring is supported by a second set of trunnions wheels operatively located with the second end wall in various embodiments.

The position of the second set of trunnions wheels is adjustable in one embodiment.

An inlet is located at the first end wall and further located along a center line of the augur in one alternative.

The second trunnion ring incorporates a discharge chute that extends through the second end wall and the second trunnion ring, and the auger further includes at least one lifting flight between the plurality of flights and the second end, so that the lifting flight lifts the food product to the discharge chute in another alternative.

There is no imperforate wall between the circumferential edge of each flight and at least part of the wall defining an interior space that is at least partially generally cylindrical in one embodiment.

There is an imperforate wall between the circumferential edge of each flight and at least part of the wall defining an interior space that is at least partially generally cylindrical, in various embodiments.

The auger includes no more than one lifting flight and the one lifting flight is perforated in one alternative.

The auger includes a plurality of lifting flights and the plurality of lifting flights is perforated in another alternative.

The interior space is generally cylindrical away from the first end wall and the second end wall in one embodiment.

A bottom of the tank includes a plurality of perforations connected to a steam source, and wherein when steam is injected through the perforations into the imperforate tank fluid in the tank is agitated in various embodiments Other principal features and advantages of will become apparent to those skilled in the art upon review of the following drawings, the detailed description and the appended claims.

DETAILED DESCRIPTION OF THE PREFERRED EMBODIMENTS

While the present disclosure will be illustrated with reference to a particular screw blancher it should be understood at the outset that the invention can also be implemented with other screw blanchers.

The preferred embodiment is a screw blancher 100 (also called an auger blancher) and may be seen in FIG. 1, 6-8, 10-12. Portions of blancher 100 may be seen in the remaining Figures. A screw 305 (FIGS. 3, 5-7 and 12-13) is preferably supported by adjustable trunnions, having an open center inlet with a single point discharge. Other than as described herein the preferred embodiment can includes features from the prior art, including cleaning access ports, temperature sensing, and water fit Trunnion, as used herein, refers to a structure such as a ring, wheels, pin, shaft or pivot on which the position of a trunnion ring or shaft and auger can be adjusted relative to the tank, and includes the cradle or support structure for the pin or pivot. By adjusting one end of the auger, the auger can be tilted relative to the tank.

The preferred embodiment is particularly well suited for pasta such as elbow macaroni, other larger pastas and diced vegetables. Other embodiments are made for larger or smaller product.

Figure 1:
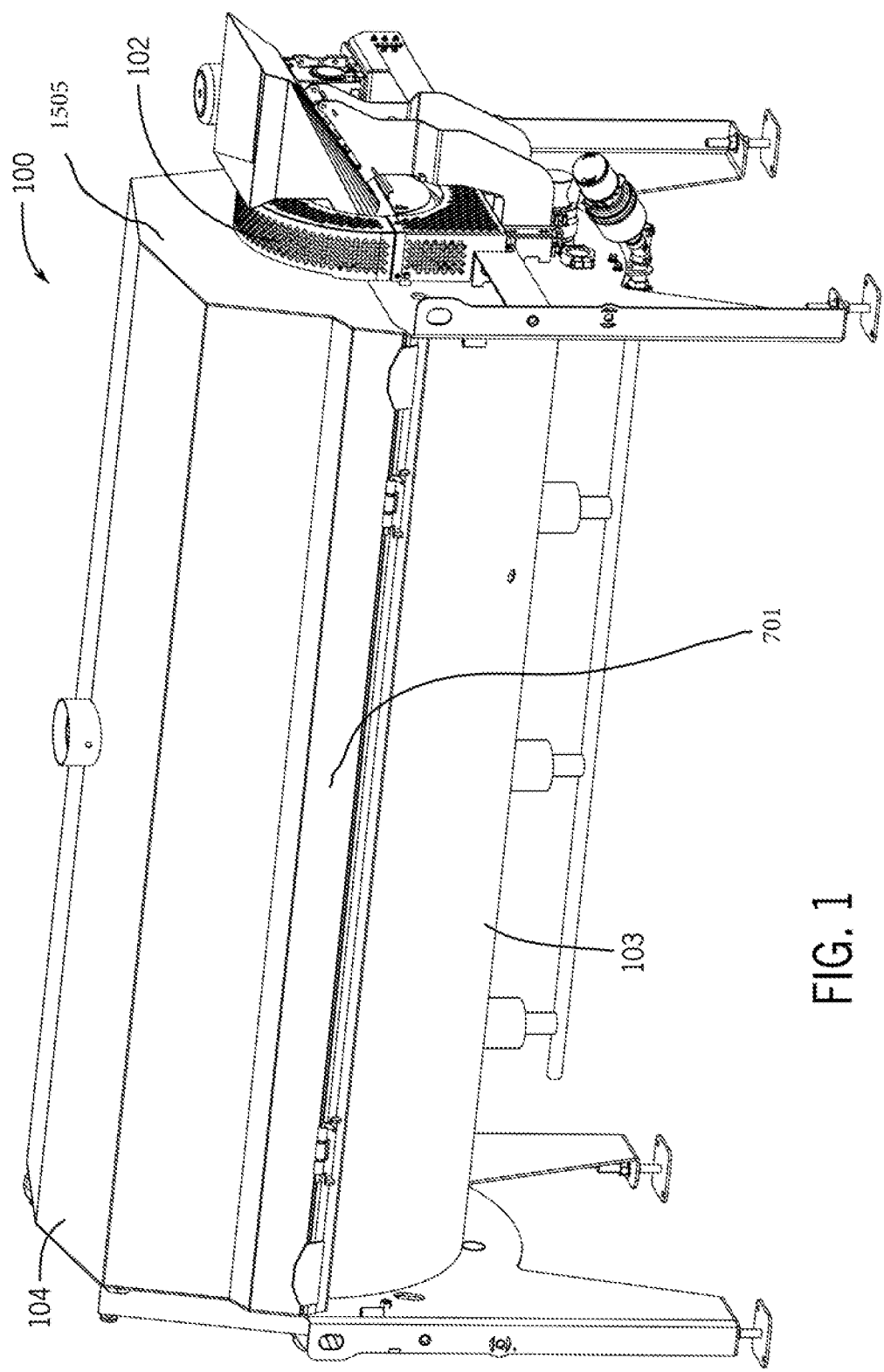
FIG. 1 is a perspective view of a screw blancher in accordance with one embodiment.
Figure 2:
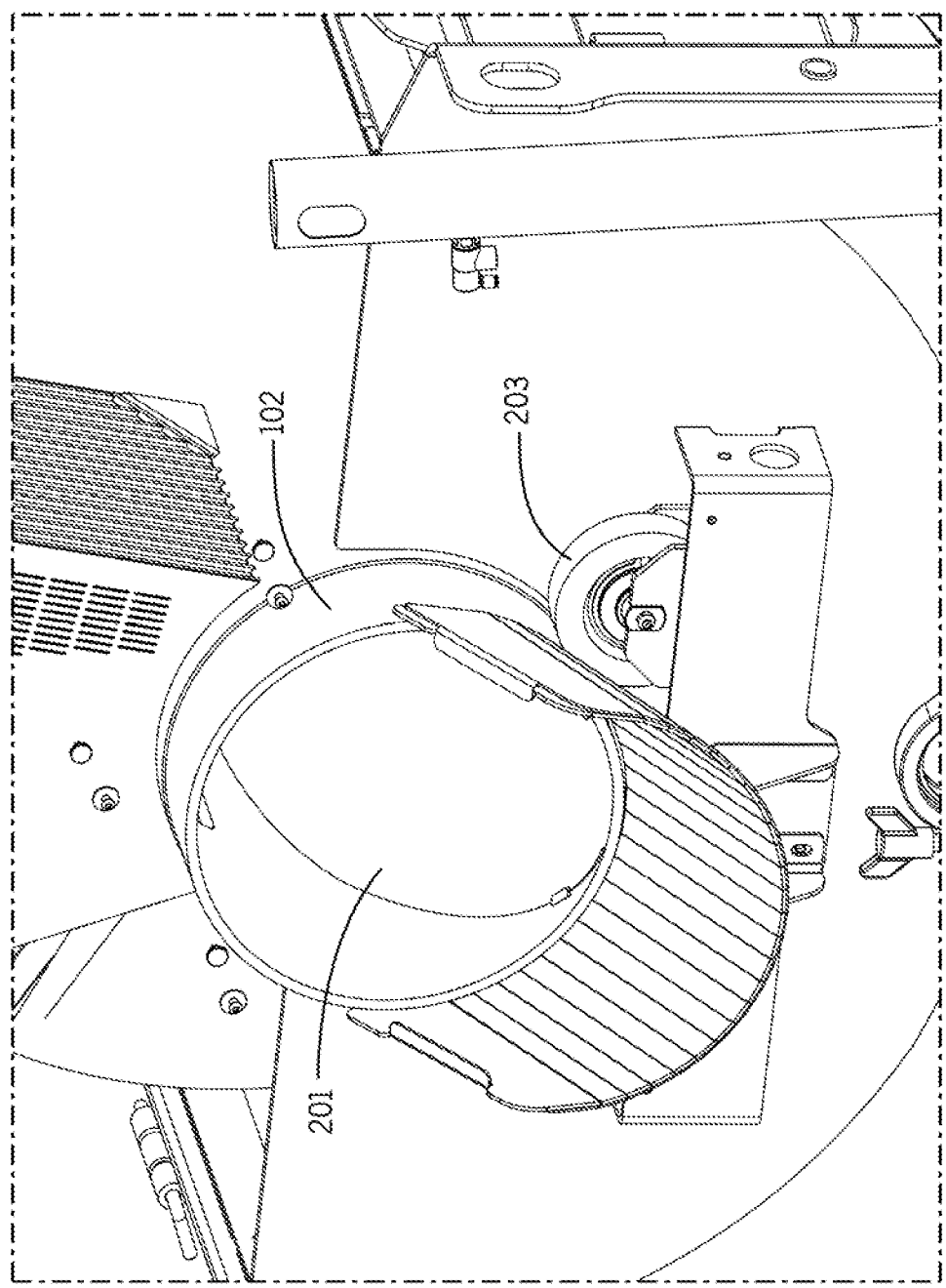
FIG. 2 is perspective view an exit end of a screw blancher in accordance with one embodiment.

The preferred embodiment of blancher 100 provides for relatively limited elevation changes from the entrance to the exit compared to prior art screw blanchers. It is particularly well suited for smaller production needs, but can be enlarged for higher production. The preferred embodiment includes an auger 305 that has at its ends trunnion rings (102, FIGS. 1-3, 5-8 and 10-13). Trunnions rings 102 are supported on each end by trunnion wheels 203 (FIG. 2). Each end is supported by two trunnion wheels 203, so the preferred embodiment has four trunnion wheels. The screw/auger is supported by trunnion wheels 203 and trunnion rings 102. A trunnion wheel is operatively located with an end wall, as that phrase is used herein to refer to the trunnion wheel being located such that the position of the end of the auger near the end wall can be adjusted relative to the end wall by the trunnion, and such that in operation the auger can turn.

While prior art rotary drums have added strength from the outside skinsheets and structural members, the skinsheets are not in this design. Rather, the center core holds and carries the weight in the preferred embodiment. The preferred embodiment provides that the trunnion wheels are idler wheels, and that the rotation is caused by a chain system connected to auger 305. Alternatives provide that trunnion wheels 203 drive auger 305.

Auger 305 is supported on the adjustable trunnions to allow for clearance adjustments and/or allow auger 305 to be elevated for cleaning. An alternative embodiment provides for air cylinders to adjust the elevation of screw 305. The preferred embodiment using adjustable trunnions aids in operating, cleaning, and making repairs. The preferred embodiment makes cleaning easier because the trunnions are able to move, raising the auger (by approximately 1") allowing food product to wash under the auger and out of the unit when cleaning.

Figure 4:
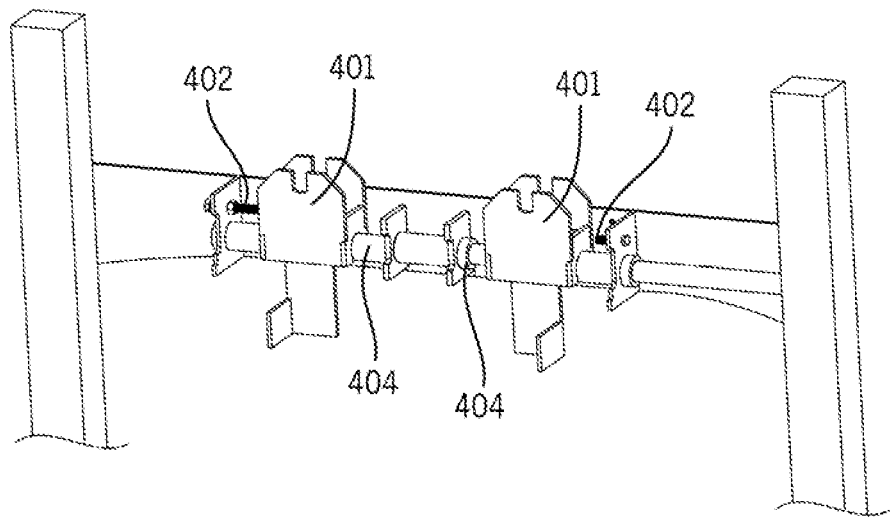
FIG. 4 is a perspective view of a trunnion mount for a screw blancher in accordance with one embodiment.
Figure 5:
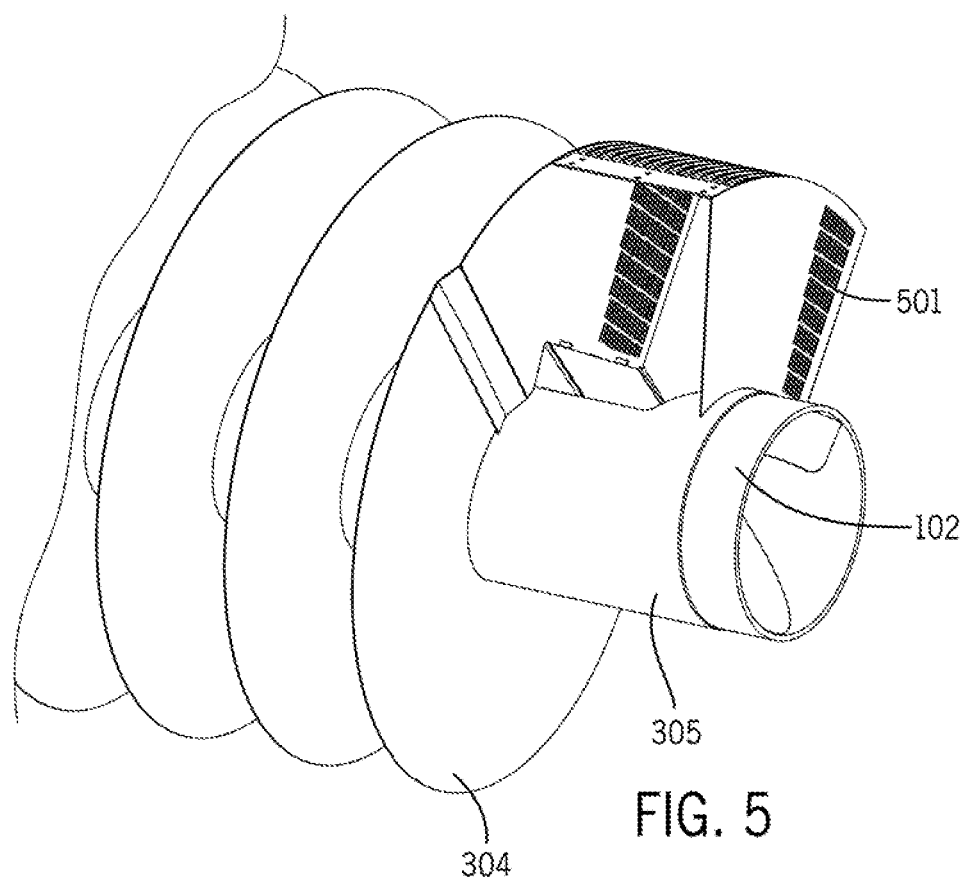
FIG. 5 is a perspective view of a lift for a screw blancher in accordance with one embodiment.
Figure 6:
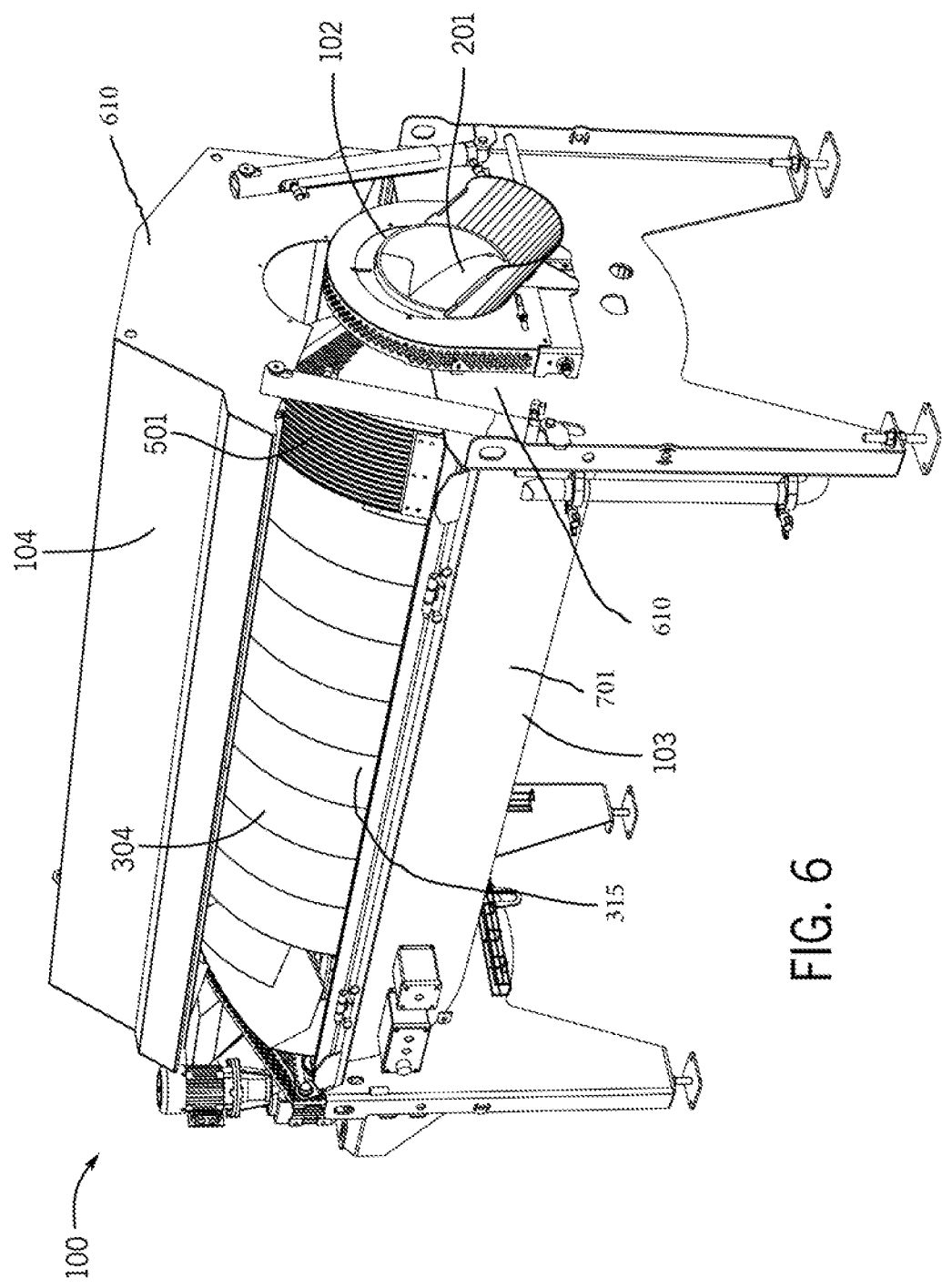
FIG. 6 is a perspective view of the outlet end of a screw blancher in accordance with one embodiment.
Figure 7:
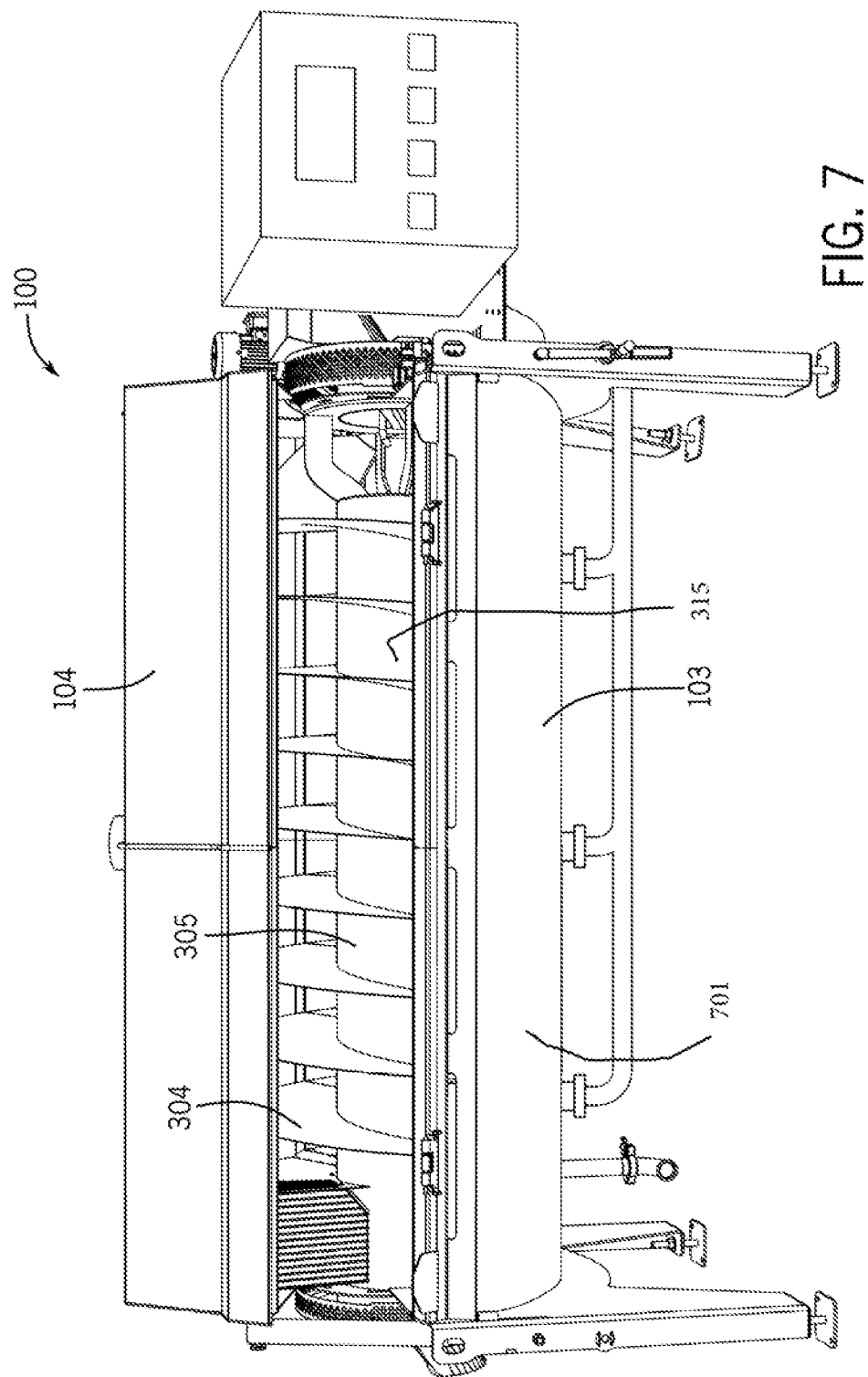
FIG. 7 is a side view of a screw blancher in accordance with one embodiment.
Figure 14:
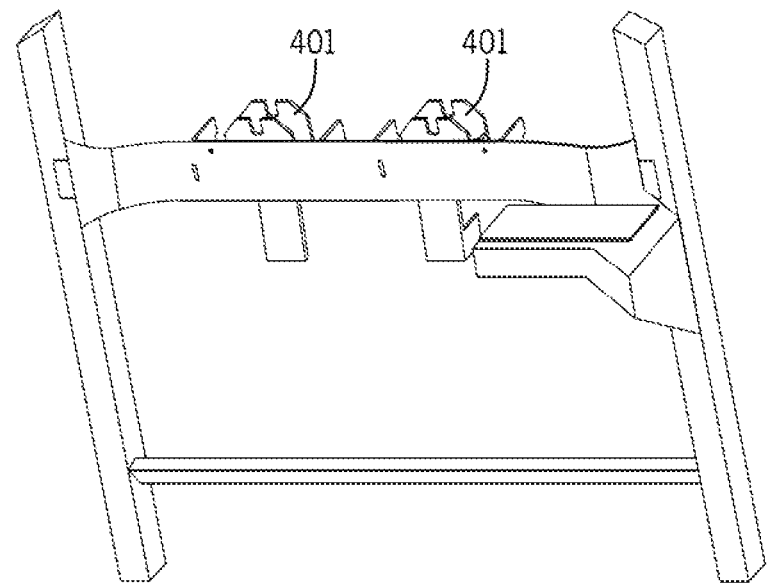
FIG. 14 is a perspective view of a trunnion mount of a screw blancher in accordance with one embodiment.
Figure 15:
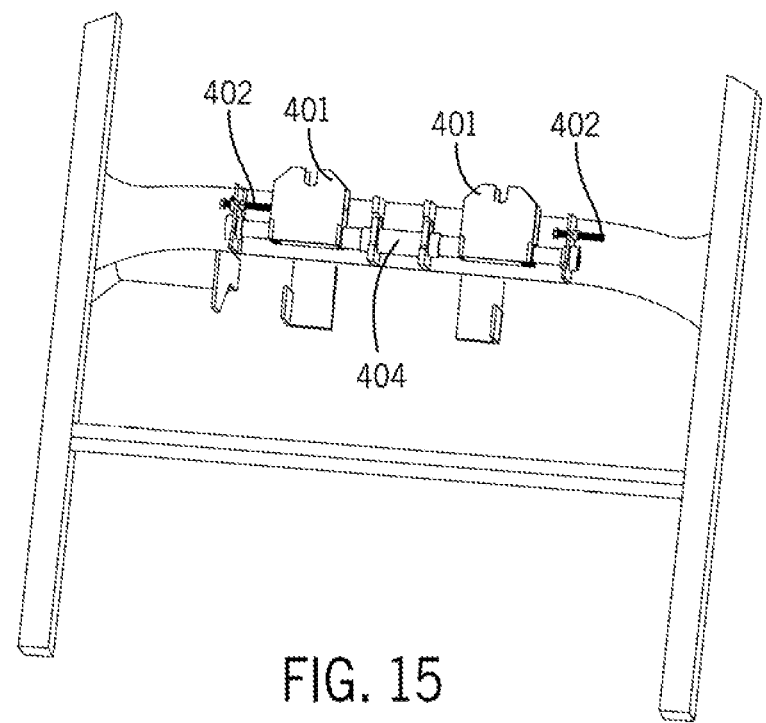
FIG. 15 is a perspective view of a trunnion mount of a screw blancher in accordance with one embodiment.

While trunnion replacement is a challenge of many types of rotary equipment, the preferred embodiment provides for the trunnions to retract sufficiently to allow for trunnion replacement without independently jacking up, or holding the augur. Thus, the trunnion has three positions: operating position, cleaning position (which bring the trunnions closer together) and trunnion change/maintenance position which drops the auger to a resting point and continues to spread apart allowing access for trunnion replacement. FIGS. 4, 14 and 15 show trunnion mounts 401. Each mount 401 supports one trunnion wheel 203, and there are two mounts 401 at each end of blancher 100. Trunnion mounts 401 are shown in operating position. For cleaning position, they are moved together with a single screw 404 (FIGS. 4 and 15) with counter threaded rods to the end of their stroke. They are then returned to the operating position and stop against a hard stop 402 (FIGS. 4 and 15). To remove trunnions, hard stop 402 is removed, allowing trunnions to move far apart to be accessible. The trunnion assembly can be assembled so that access is from either left hand, or right hand sides or both sides if desired.

Guards are preferably provided so that the drive chain for the auger protects the drive chain in the operating, cleaning and repair position. Guards preferably accommodate all three positions, and function as needed and not allow the auger to damage itself or the tank when in the maintenance access position. The adjustable trunnions feature could be used on other types of blanchers, such as rotary drum blanchers. For example, the trunnions of USP 7500426 could be replaced with the trunnions disclosed herein to provide operating, cleaning and repair positions.

Another feature of the preferred embodiment is a single point discharge 201 (FIGS. 2, 6, 8, 11, and 12). The single point discharge must capture product that is free in the tank, and not constrained by any other means. The preferred single point discharge is a discharge chute, extending through the second end wall and the second trunnion ring, and in line with the center of the screw. One or more lifting flights lift product to the discharge. Because the product is not constrained within a cylinder, the discharge bucket scoops the product out of the tank and discharges it out of the machine. A large perforated scoop or lifting flight 501 (FIGS. 5, 6, 12 and 13) passes through the tank, capturing and dewatering the product, allowing product to discharge out the machine via a sloped slide internal to the auger shaft.

Figure 3:
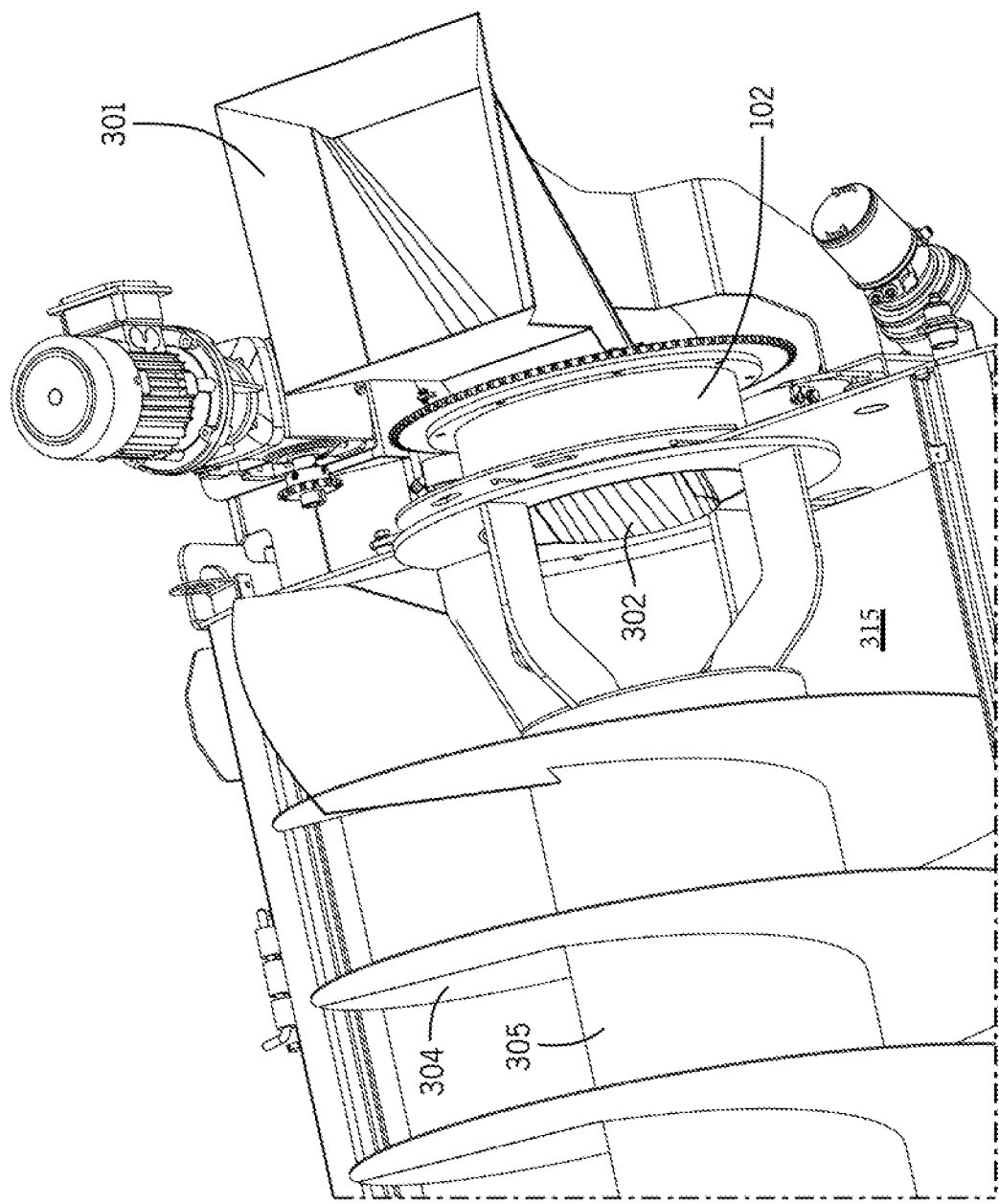
FIG. 3 is perspective view of an entrance end of a screw blancher in accordance with one embodiment.
Figure 12:
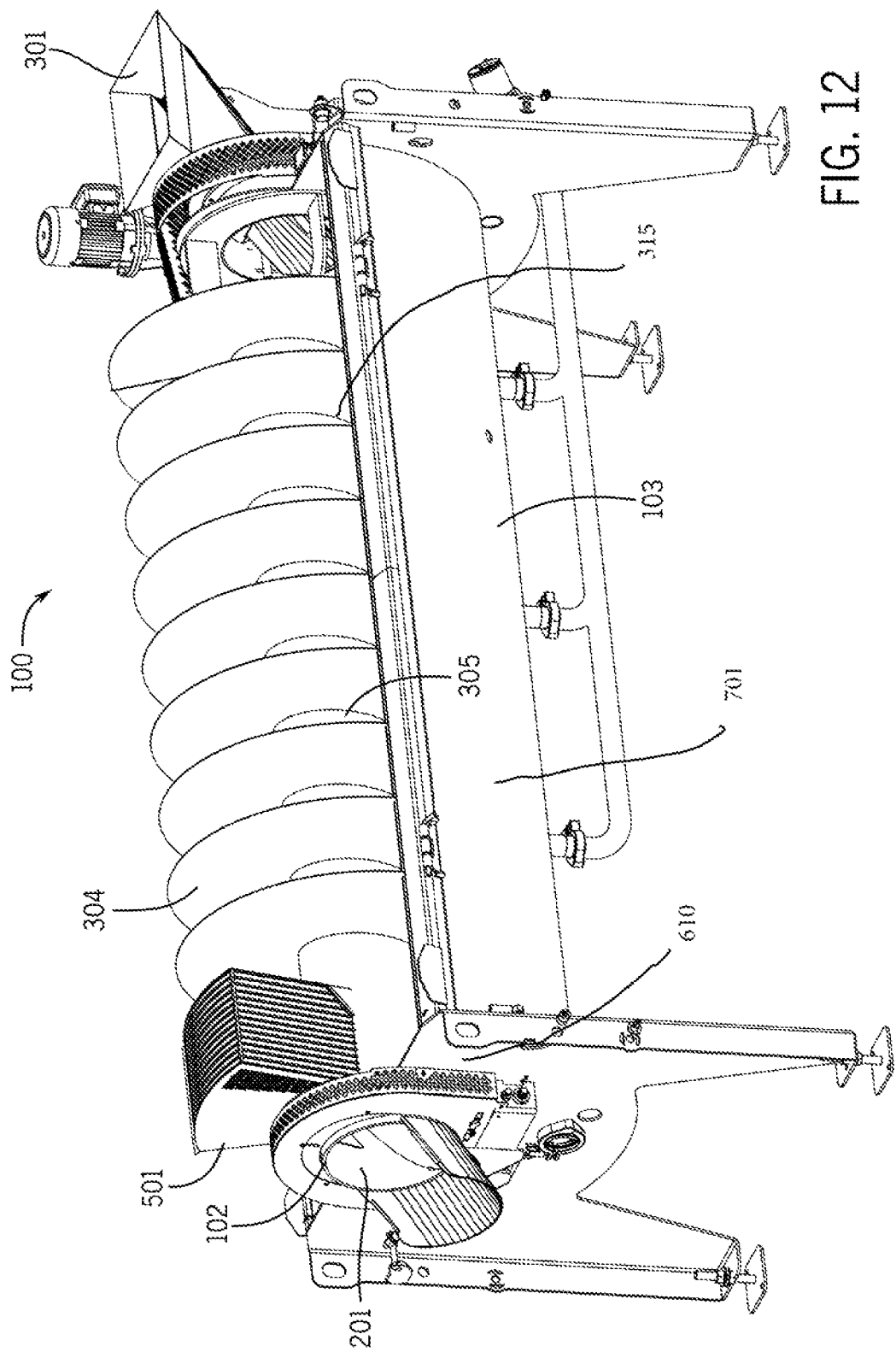
FIG. 12 is a perspective view of a screw blancher with the cover off in accordance with one embodiment.
Figure 13:
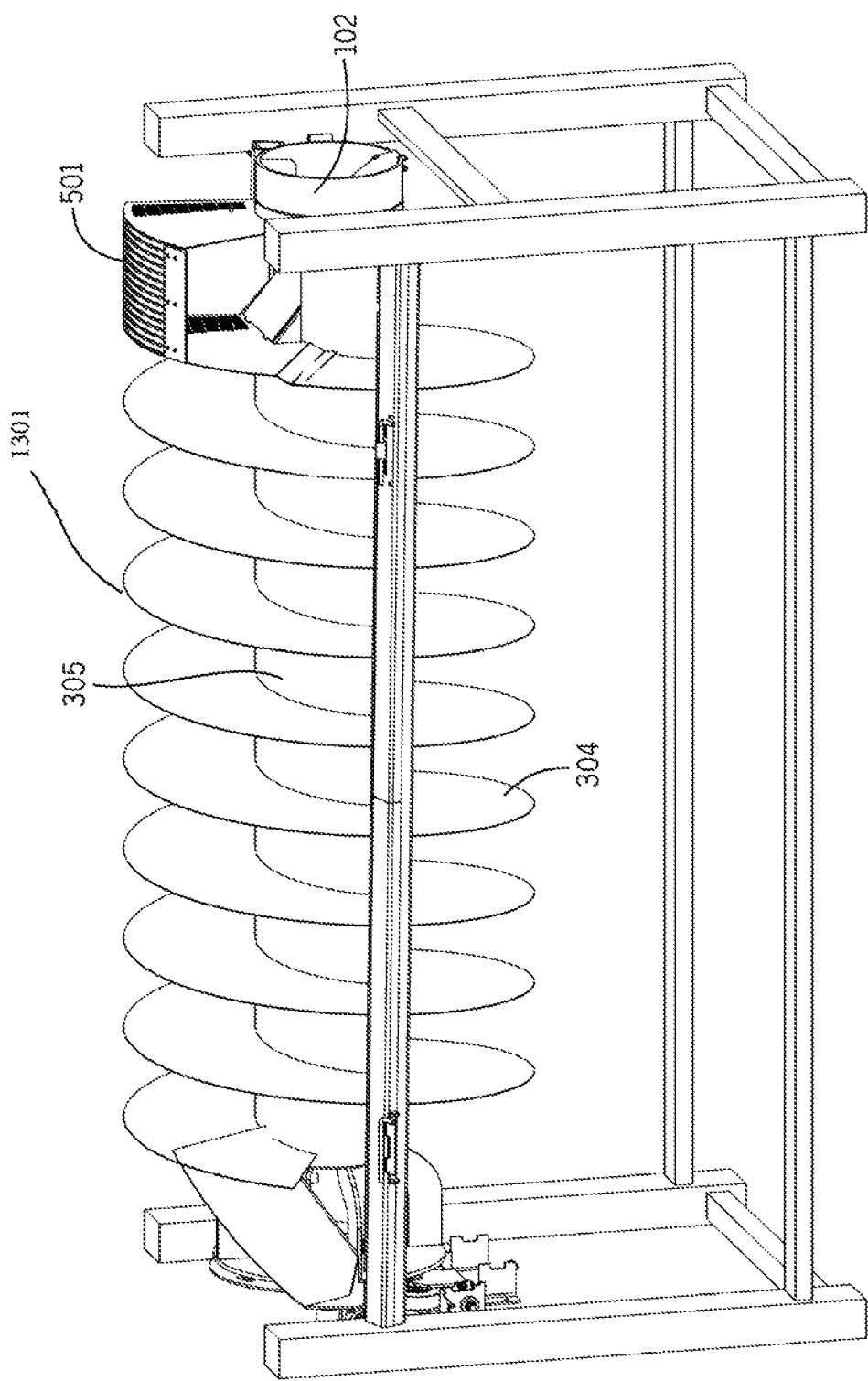
FIG. 13 is a perspective view of the a screw or auger of a screw blancher in accordance with one embodiment.

Another feature of the preferred embodiment is an open center inlet. Product may be placed into a chute 301 (FIGS. 3 and 9-12) and the product drops through chute 301 and into blancher 100 through an inlet 302 (FIG. 3). The open center of the allows product to be inputted into the machine along the center line. Water levels may be lower than would be found in traditional screw blanchers with off center, over head entrances. FIG. 3 also shows a screw or auger 305 (FIGS. 3, 7, 8, 9, 12 and 13) having flights 304 (FIGS. 3, 12 and 13).

The preferred embodiment provides for steam be introduced into tank 104 through perforations (1501, FIG. 16) in the bottom of tank 104 to heat the water. The preferred embodiment provides more perforations in the inlet end 1505 of tank 104 than the outlet end of tank 104. Introducing steam as in the preferred embodiment provides the added benefit of creating agitating that causes particulate product (like elbow macaroni, e.g.) to swirl across flights from side to side. This added feature provides for more efficient heat transfer and new water is pushed around the product to move out cooler water to even out temperature, and helps reduce product clumping.

The preferred embodiment has a two-way-flip top cover 104 (FIGS. 1 and 6-11), or a vertical lift cover, to provide access for cleaning, and service.

Blancher 100 is for processing food product. Food product, as used herein, refers to loose food items or food within a container. Blancher 100 includes tank 103 (FIGS. 1, 6, 7-12) and auger 305 (FIGS. 6-12.) Tank 103 is preferably an imperforate tank. Imperforate tank, as used herein, refers to a tank that can hold a fluid in normal operation and does not have a plurality of perforations allowing for fluid flow therethrough during normal operation, other than perforations used to provide steam into the tank. A tank with openings at each end, and/or a lid that can be opened, but without a plurality of perforations and that hold fluid in normal operation is an imperforate tank. A tank with perforations used to provide steam into the tank to heat the water can be an imperforate tank.

Figure 16:
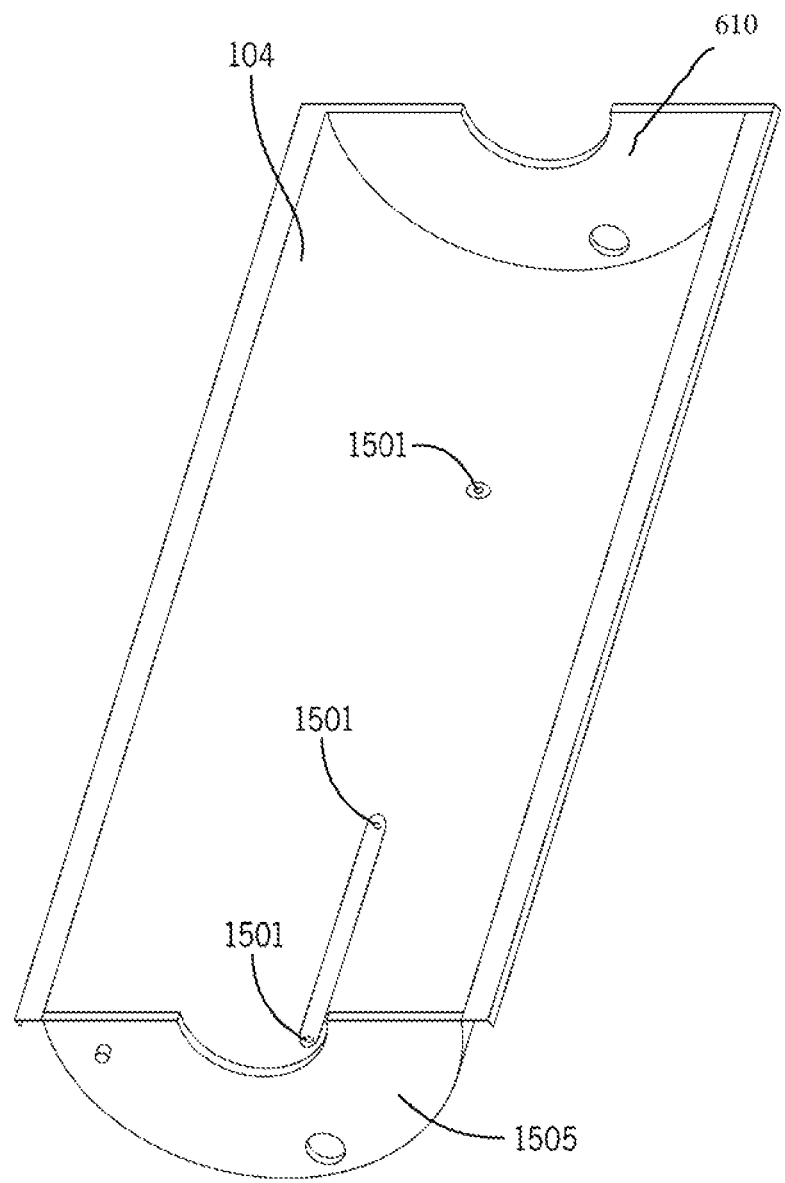
FIG. 16 is a perspective view of tank in accordance with one embodiment.

Tank 103 has a wall 701 (FIGS. 6-12 and 16) defining an interior space 315 (FIGS. 3, 6-8, 12 and 16) that is at least partially generally cylindrical as shown in FIG. 16. The partially generally cylindrical shape of FIG. 18 extends an arc of 180 degrees. An interior space that is at least partially generally cylindrical, as used herein refers to a space that has an arc of at least 90 degrees defining a quarter of a cylinder. Generally cylindrical can include bolts, seams, fixtures, end wall, etc that vary from a perfect cylindrical shape.

Tank 103 has first end wall 1505 (FIGS. 1, 9, 10 and 16) and a second end wall 610 (FIGS. 6, 8, 11, 12 and 16). Auger 305 is disposed in interior space 315, and auger 305 has plurality of flights 304 (FIGS. 3, 5-9 and 12-13). Each flight 304 has a circumferential edge 1301 (FIG. 13) disposed in close proximity to wall 701. Flights 304 move food product from first end 1505 to second end 610 as augur 305 is turned. A circumferential edge disposed in close proximity to the wall, as that phrase is used herein, refers to a circumferential edge that generally follows the contour of the wall, and does not allow the majority of the food product being processed to pass between the circumferential edge and the wall.

Auger 305 is supported by a trunnion ring 102 (FIGS. 1 and 3) extending through first end wall 1505, such that as trunnion ring 102 turns, augur 305 and plurality of flights 304 are turned. Trunnion ring 102 is supported by a first set of trunnions wheels operatively located with the first end wall. A second trunnion ring 102 extends through second end wall 610 and second trunnion ring 102 is supported by a second set of trunnion wheels 203 (FIG. 2) operatively located with second end wall 610 in the preferred embodiment. The position of each sets of trunnion wheels is adjustable as discussed above with respect to FIG. 4.

In the preferred embodiment blancher 100 includes inlet 302 which is preferably located at first end wall 1505 and further located along a center line of augur 305. Preferably inlet 302 includes chute 301.

In the preferred embodiment blancher 100 includes a discharge chute 201 (FIGS. 2, 6, 8 and 11-12) which is a single point discharge. Discharge chute/single point discharge 201 extends through second end wall 610. Auger 305 preferably includes at least one lifting flight 501 between the plurality of flights and the second end, such that the lifting flight lifts the food product to the discharge chute. Preferably, lifting flights 501 are perforated Alternatives provide for no more than one lifting flight 501 or for a plurality of lifting flights 501. Lifting flight, as used herein, refers to a flight that moves the food product primarily in a vertical direction.

Figure 8:
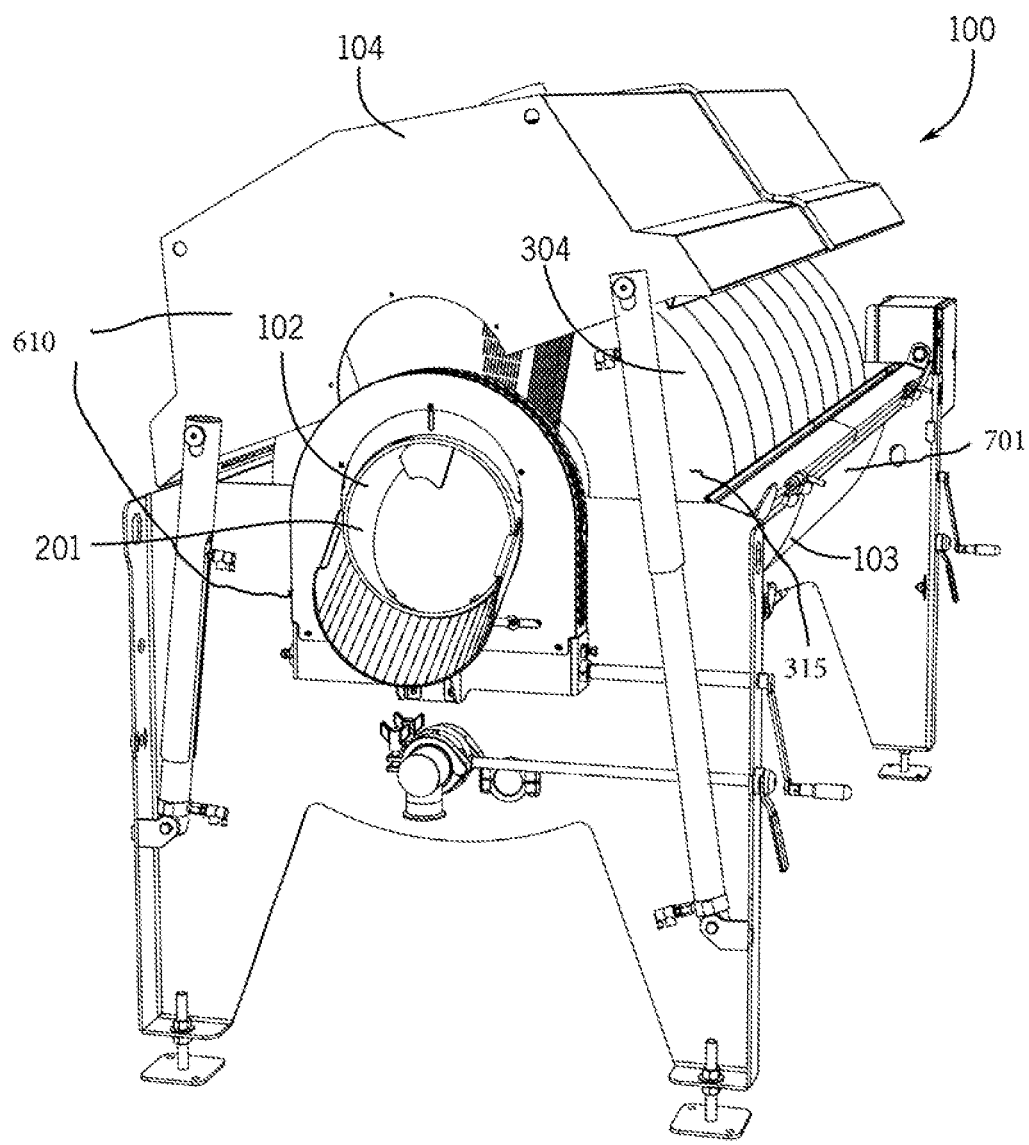
FIG. 8 is a perspective view of the outlet end of a screw blancher in accordance with one embodiment.
Figure 9:
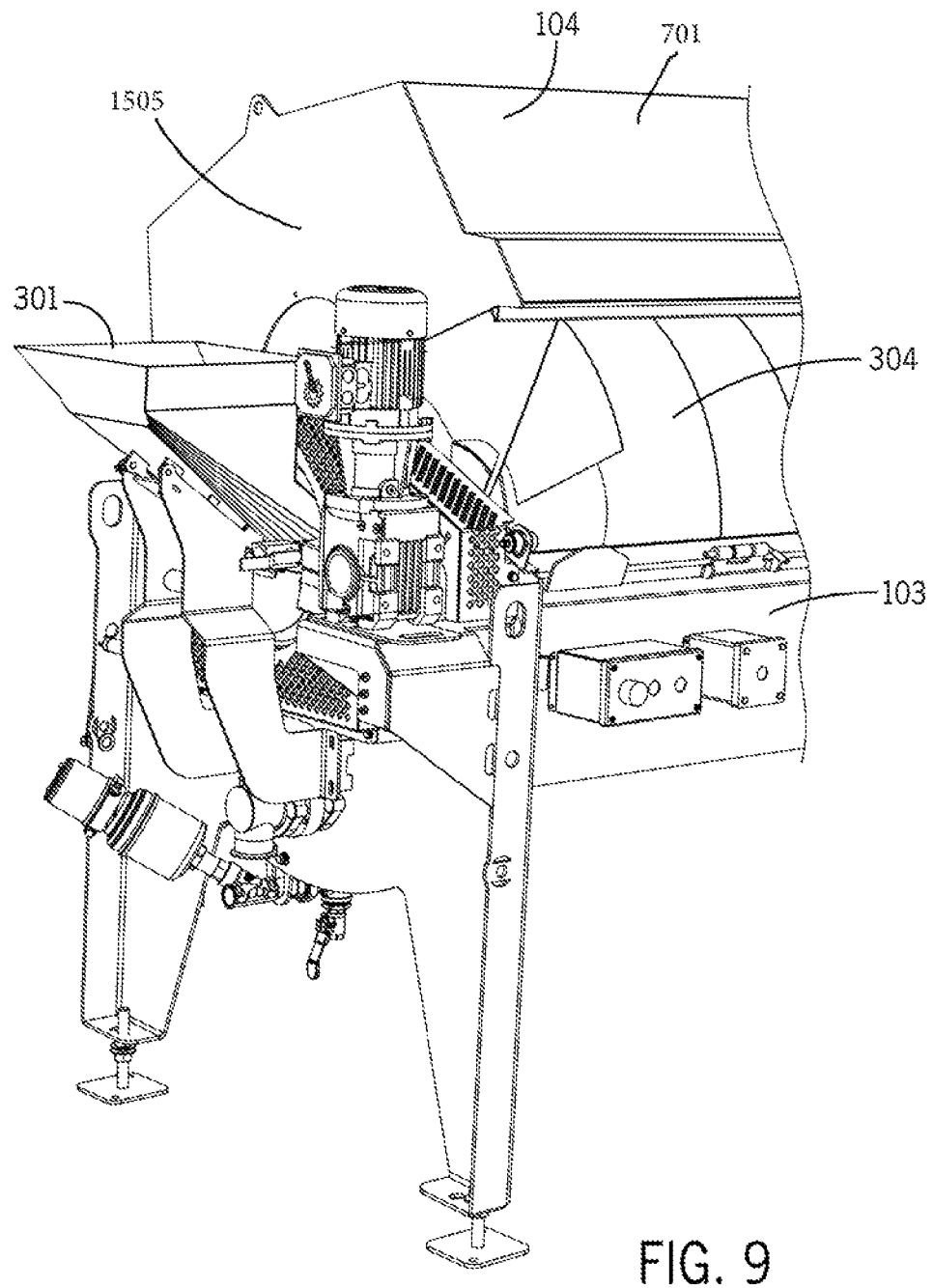
FIG. 9 is a perspective view of the inlet end of a screw blancher in accordance with one embodiment.
Figure 10:
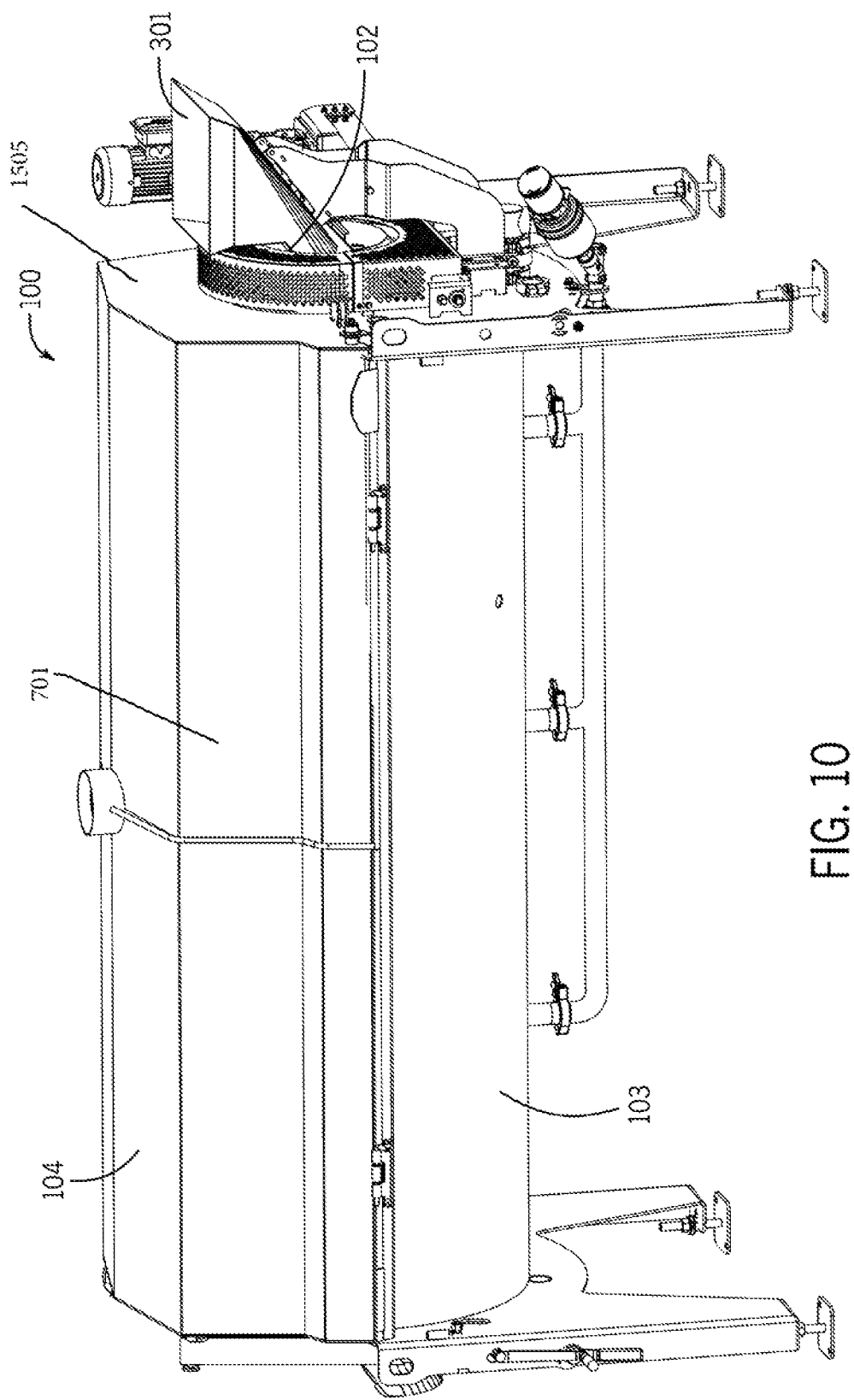
FIG. 10 is a perspective view of the inlet end of a screw blancher in accordance with one embodiment.
Figure 11:
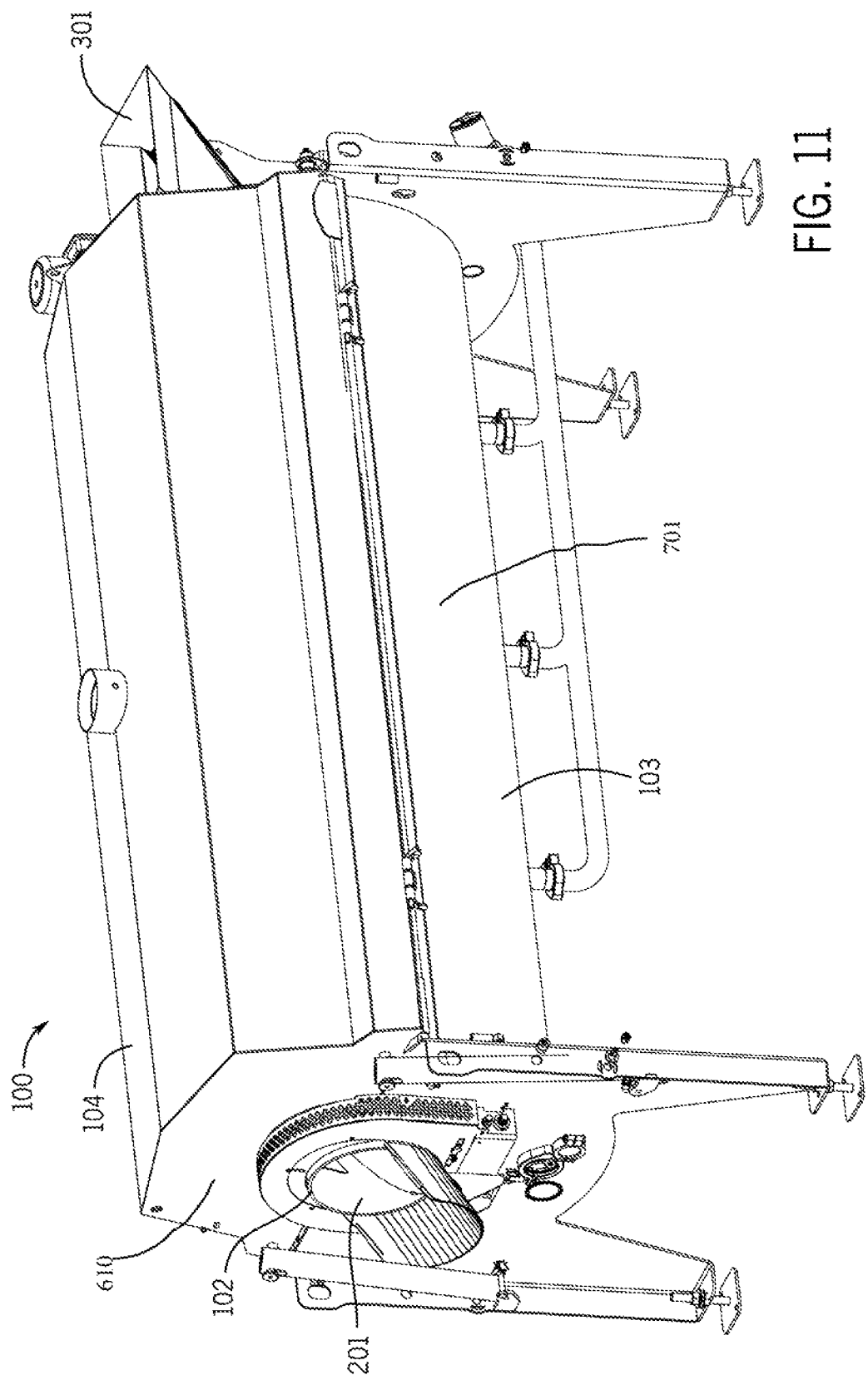
FIG. 11 is a perspective view of the outlet end of a screw blancher in accordance with one embodiment.

There is no imperforate wall between circumferential edge 1301 of each flight 304 and at least part of wall 701 (defining the interior space and that is at least partially generally cylindrical) as shown in FIG. 8, but in one alternative there is an imperforate wall between circumferential edge 701 of each flight 304 and at least part of wall 701.

A bottom of tank 701 includes a plurality of perforations 1501 connected to a steam source. When steam is injected through the perforations into the imperforate tank then fluid in the tank is agitated.

Numerous modifications may be made to the present disclosure which still fall within the intended scope hereof Thus, it should be apparent that there has been provided a screw blancher that fully satisfies the objectives and advantages set forth above. Although the disclosure has been described specific embodiments thereof it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A blancher for processing food product, comprising:
   a tank having a wall defining an interior space that is at least partially generally cylindrical, and having a first end wall near a first end and a second end wall near a second end;
   an auger, disposed in the interior space, the auger having a plurality of flights, each flight having a circumferential edge disposed in close proximity to the wall, wherein the plurality of flights move the food product from one of the first end and the second end to the other of the first end and the second end as the augur is turned; and
   wherein the auger is supported by a trunnion ring extending through the first end wall and wherein such that as the trunnion ring turns, the augur and the plurality of flights are turned.

2. The blancher of claim 1, wherein the trunnion ring is supported by a first set of trunnions wheels operatively located with the first end wall.

3. The blancher of claim 2, wherein a position of the first set of trunnions wheels is adjustable.

4. The blancher of claim 3, wherein a second trunnion ring extends through the second end wall and wherein the second trunnion ring is supported by a second set of trunnions wheels operatively located with the second end wall.

5. The blancher of claim 4, wherein a second trunnion position of the second set of trunnions wheels is adjustable.

6. The blancher of claim 1, further comprising an inlet located at the first end wall and further located along a center line of the augur, and wherein the plurality of flights move the food product from the first end to the second end as the augur is turned.

7. The blancher claim 6, wherein the second trunnion ring incorporates a discharge chute, extending through the second end wall and the second trunnion ring, and wherein the auger further includes at least one lifting flight between the plurality of flights and the second end, whereby the lifting flight lifts the food product to the discharge chute.

8. The blancher of claim 7, wherein there is no imperforate wall between the circumferential edge of each flight and at least part of the wall defining an interior space that is at least partially generally cylindrical.

9. The blancher of claim 7, wherein there is an imperforate wall between the circumferential edge of each flight and at least part of the wall defining an interior space that is at least partially generally cylindrical.

10. The blancher of claim 8, wherein the auger includes no more than one lifting flight and the one lifting flight is perforated.

11. The blancher of claim 8, wherein the auger includes a plurality of lifting flights and the plurality of lifting flights is perforated.

12. The blancher of claim 8, wherein the interior space is generally cylindrical away from the first end wall and the second end wall.

13. The blancher of claim 1, wherein a bottom of the tank includes a plurality of perforations connected to a steam source, and wherein when steam is injected through the perforations into the imperforate tank fluid in the tank is agitated.

14. A blancher for processing food product, comprising:
   a tank having a wall defining an interior space that is at least partially generally cylindrical, and having a first end wall near a first end and a second end wall near a second end;
   an auger, disposed in the interior space, the auger having a plurality of flights, each flight having a circumferential edge disposed in close proximity to the wall, wherein the plurality of flights move the food product from the first end to the second end as the augur is turned; and
   an inlet located at the first end wall and further located along a center line of the augur;
   wherein the auger is supported by a trunnion ring extending through the first end wall and wherein such that as the trunnion ring turns, the augur and the plurality of flights are turned.

15. The blancher of claim 14, wherein the trunnion ring is supported by a first set of trunnions wheels operatively located with the first end wall.

16. The blancher of claim 15, wherein a position of the first set of trunnions wheels is adjustable.

17. The blancher claim 14, further comprising a discharge chute extending through the second end wall, and wherein the auger further includes at least one lifting flight between the plurality of flights and the second end, whereby the lifting flight lifts the food product to the discharge chute.

18. The blancher of claim 17, wherein the auger includes no more than one lifting flight and the one lifting flight is perforated.

19. The blancher of claim 17, wherein the auger includes a plurality of lifting flights and the plurality of lifting flights is perforated.

20. A blancher for processing food product, comprising:
   a tank having a wall defining an interior space that is at least partially generally cylindrical, and having a first end wall near a first end and a second end wall near a second end;
   an auger, disposed in the interior space, the auger having a plurality of flights, each flight having a circumferential edge disposed in close proximity to the wall, wherein the plurality of flights move the food product from the first end to the second end as the augur is turned; and
   a discharge chute extending through the second end wall, and wherein the auger further includes at least one lifting flight between the plurality of flights and the second end, whereby the lifting flight lifts the food product to the discharge chute;
   wherein the auger includes no more than one lifting flight and the one lifting flight is perforated.

21. The blancher of claim 20, wherein the auger is supported by a trunnion ring extending through the first end wall, and wherein such that as the trunnion ring turns, the augur and the plurality of flights are turned.

22. The blancher of claim 21, wherein the trunnion ring is supported by a first set of trunnions wheels operatively located with the first end wall.

23. The blancher claim 20, further comprising an inlet located at the first end wall and further located along a center line of the augur.

24. The blancher of claim 20, wherein the auger includes a plurality of lifting flights and the plurality of lifting flights is perforated.

* * * * *